United States Patent

[11] 3,586,814

| [72] | Inventor | Charles C. Pease<br>Pennsauken, N.J. |
|---|---|---|
| [21] | Appl. No. | 729,794 |
| [22] | Filed | May 16, 1968 |
| [45] | Patented | June 22, 1971 |
| [73] | Assignee | Omark Industries, Incorporated<br>Portland, Oreg. |

[54] CONTROL CIRCUIT FOR STUD FEEDING MECHANISM
    16 Claims, 2 Drawing Figs.

[52] U.S. Cl. ............................................ 219/98
[51] Int. Cl. ........................................... B23k 9/20
[50] Field of Search ............................... 219/98, 103, 99

[56] References Cited
UNITED STATES PATENTS

| 2,932,725 | 4/1960 | Ainsworth et al. | 219/98 |
| 3,312,810 | 4/1967 | Neumeier | 219/98 X |
| 3,327,089 | 6/1967 | Napoli | 219/98 |
| 3,339,799 | 9/1967 | Spisak | 219/98 X |
| 3,392,257 | 7/1968 | Glorioso | 219/98 |

Primary Examiner—J. V. Truhe
Assistant Examiner—R. E. O'Neill
Attorney—Charles F. Duffield ABSTRACT: Coordinator for coordinating the operation of a stud welding controller, a stud welding gun and mechanism for automatically feeding studs to a welding gun including circuit means for overriding the welding cycle initiating signal whenever the welding gun is not in the welding position and for completing a circuit for initiating automatic stud feeding whenever the welding gun is in other than its welding position. A manually operable stud feeding circuit is included. An AND gate is employed in the automatic stud feeding circuit to prevent stud feeding until both a stud welding cycle initiating signal and a stud feeding signal are received. The welding cycle initiating circuit and the manually operable stud feeding circuit include memory circuits which maintain the signals from the circuits for a predetermined period of time determined by a preset timer which is initiated by passage of a signal through the AND gate and which resets the memory circuits upon timing out.

INVENTOR.
Charles C. Pease

ATTORNEY.

CONTROL CIRCUIT FOR STUD FEEDING MECHANISM

SUMMARY OF INVENTION

This invention applies to coordinator for a stud feeding mechanism and specifically to a coordinator for coordinating the operation of a stud welding controller, a stud welding gun and mechanism for automatically feeding studs to the welding gun and is especially adapted for common use with controllers and welding guns operable in different modes of welding.

Most stud feeding mechanisms in use today are specifically designed for a given application. These mechanisms are not readily adaptable for use with other welding guns or controllers operating in different modes of welding than that particular mode for which the apparatus was designed. It can be readily appreciated that it would be a cost saving factor if a stud feeding mechanism could be employed with different types of apparatus and for different applications.

The present invention accomplishes the foregoing and is operable with a wide variety of welding equipment operating in different modes. In the present coordinator, all control cables both from the controller and from the welding gun are connected through the coordinator and operate within the specific circuitry therein to make the control apparatus adaptable for use with different apparatus.

In the present invention, the gun trigger in the welding gun is used, not to initiate the welding cycle, but to initiate a sequence in the coordinator which in turn triggers the welding cycle upon the existence of certain predetermined conditions. One of these conditions is that the welding gun be in position for welding.

The coordinator also includes a circuit for automatically initiating feeding of the studs as well as a circuit for manual operation of the stud feeding mechanism. In the automatic stud feeding circuit, the studs will not be fed until there is present the concurrence of two signals which are passed through and AND gate, the first being a signal which is indicative of the triggering signal to the controller and, the second, a signal representative that the welding gun is not in welding position.

Upon the concurrence of the two signals to the AND gate, a signal from the AND gate energizes the various escapement mechanisms and solenoids necessary for carrying through a stud feeding operation and, as well, initiates the timing function of a set timer.

Both the cycle initiating circuit and the manually operable circuit for initiating a stud feeding cycle utilize memory circuits which, upon a signal being applied to the memory circuit, produce an output signal which is held until it is reset by the timer upon timing out.

The means utilized for rendering the circuit selectively operable depending upon whether the gun is in welding position or not is accomplished by means of a circuit interruptor which is effective to selectively open or close the particular circuit in question only when a circuit is completed through the stud or welding gun and the workpiece.

Other advantages and objects of the present invention will be apparent from the following detailed description of the invention taken in conjunction with the drawings.

DESCRIPTION OF INVENTION

Figure 1:
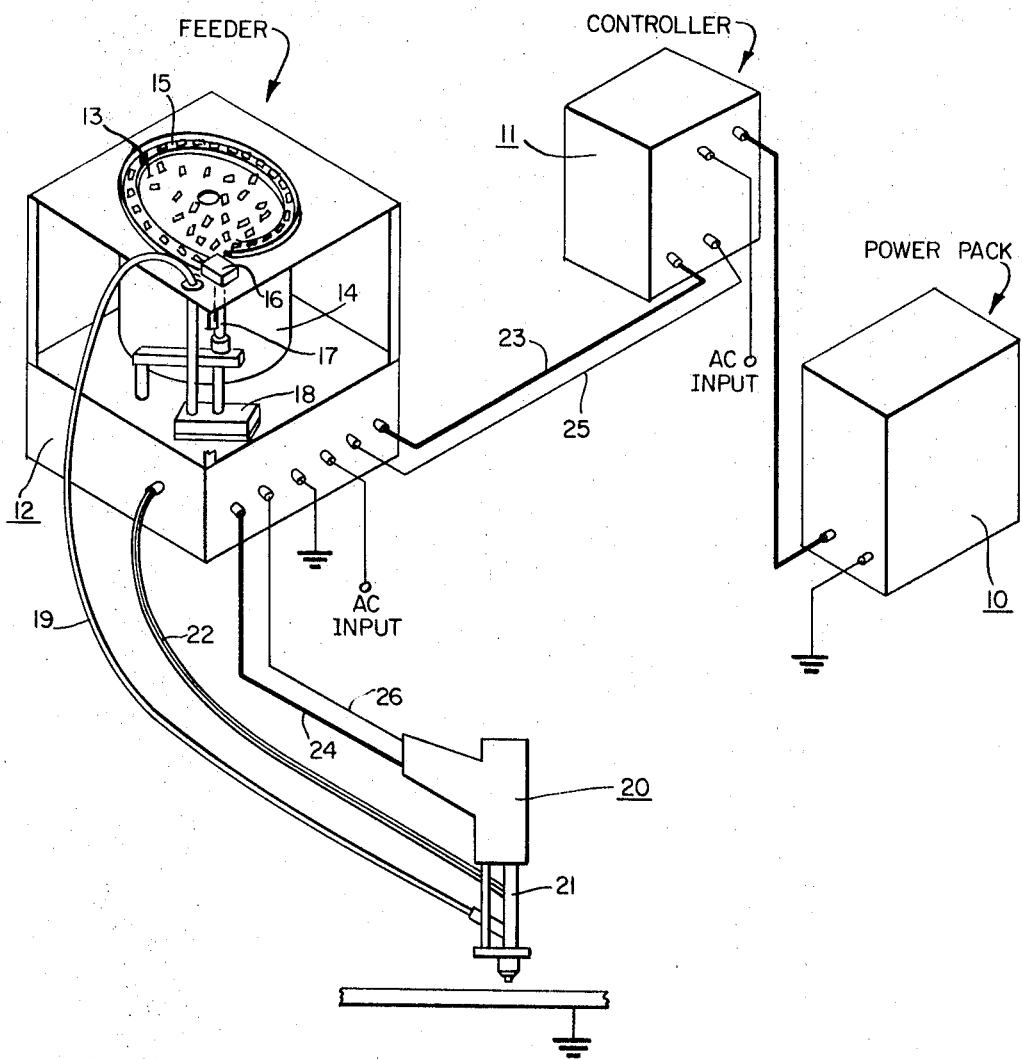
FIG. 1 is a schematic view partly in perspective and partly in elevation showing the complete system in which the present invention is embodied.

Shown in FIG. 1 is the entire welding system in which the present invention is embodied. A power pack 10 is employed which provides the welding energy for the welding process. This power pack may be one of many types, i.e., stored energy, rectified AC input, or battery powered. The welding energy from the power pack 10 is delivered to a controller 11 which selectively controls the welding current as required in the welding process.

The welding energy is passed from the controller 11 by means of conductor 23 through the stud feeding and control apparatus 12 and thence to the welding gun 20 by means of conductor 24.

In a like manner, the controller senses and controls the welding process through a plurality of cables passing from the controller to the feeder and coordinator as indicated at 25 which in turn pass from the control apparatus to the welding gun as indicated by the conductor 26.

Accordingly, it will be appreciated that the welding energy and control functions of the present apparatus all pass through the coordinator 12.

The particular type of stud feeding mechanism to which the present invention is applicable is, as shown here, one of the vibratory type which employs a general depository 13 for a plurality of studs to be fed to the welding gun. Revolving mechanical waves are generated by an electromagnetic mechanism 14 beneath the bowl and these waves mechanically move the studs up an inclined ramp 15 to a stud orientation mechanism 16.

Upon the studs reaching the stud orientation mechanism 16, they pass by means of a loading tube 17 to an escapement mechanism 18 from which they are pneumatically dispatched by means of a supply line 19 to the chuck of a welding gun 20. Once the studs are in the chuck of the welding gun, they are pneumatically inserted in place in the chuck by means of air cylinder 21 operated under the control of pneumatic lines 22.

Figure 2:
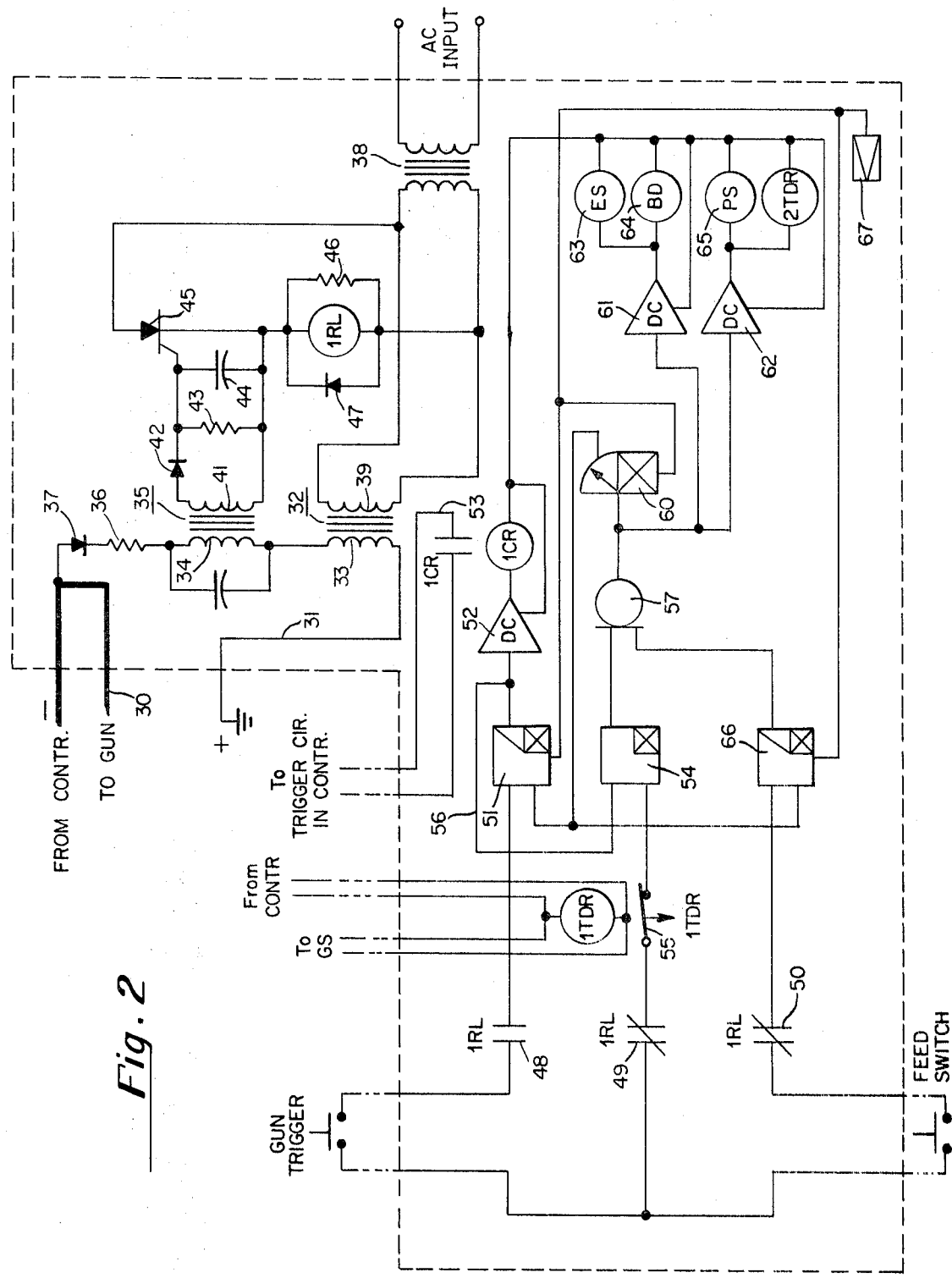
FIG. 2 is a schematic diagram of the circuit of present invention.

The specific circuitry which accomplishes the coordination of operation between the stud welding controller, the stud welding gun and the feeding mechanism is shown in FIG. 2, where for simplicity of illustration, the stud welding gun and controller have not been shown but their particular connections have been appropriately indicated.

The operation of the control circuit of FIG. 1 can be best understood by first assuming that the welding gun has received a stud and is ready to begin a welding cycle. The operator will first place the welding gun in contact with the workpiece. When this has been done, the stud, or a leg of the welding gun, depending upon the mode of operation, will be in contact with the workpiece. When this has been accomplished, a circuit will be completed through a portion 30 of the welding conductor, through the welding gun and across the workpiece and returned by means of a conductor 31 to a transformer 32. At the transformer 32, the circuit is then completed by means of the secondary 33 thereof and through the primary 34 of transformer 35 and finally by means of a current limiting resistor 36 and diode 37 back to the conductor 30.

An AC input to transformer 38 induces a potential in the primary 39 of transformer 32. The resultant induced voltage in the secondary 33 will, whenever the circuit is completed as above described, cause a current to flow through the primary 34 of transformer 35. This current will be in half-wave form due to diode 37.

The resulting current waveform in the secondary 41 is again in half-waveform due to the presence of diode 42. The resulting current flow will, by reason of resistor 43 result in a potential across capacitor 44.

When the potential across capacitor 44 reaches a predetermined valve the potential on the gate of SCR 45 will rise to a level where the SCR is turned on.

The SCR 45 is across the output of the transformer 38 and, upon the SCR being turned on, will pass current through relay 1RL to energize the relay.

A resistor 46 in parallel with relay 1RL aids in turning on the SCR. The diode 47 in parallel with the relay 1RL aids in maintaining the relay on during the negative half cycles of current being impressed upon the SCR by the output of the transformer 38.

Whenever relay 1RL is energized, normally open relay contacts 48 will be closed and normally closed relay contacts 49 and 50 will be opened.

If the operator now depresses the gun trigger, a circuit will be completed through the gun trigger and through relay contacts 48 to a memory circuit 51. It is to be noted that, if the gun were not in welding position, relay contacts 48 would be open and no effect would occur on depressing the gun trigger. The receipt of the signal to the memory circuit 51 switches the output of the memory circuit to a high level which is impressed upon a DC amplifier 52 which, in turn, operates control relay 1CR.

Upon control relay 1CR being energized, control relay contacts 53 are closed which complete a circuit in the controller to trigger or initiate the welding cycle.

Assume now that the operator holds the gun in contact with the stud and the welding cycle has been completed. As long as the gun is held in contact with the stud, the circuit through the stud and workpiece will be completed and relay 1RL will remain energized. So long as relay 1RL is energized, relay contacts 49 will remain open and no signal will be permitted to pass across contacts 49 to AND gate 54. The moment the operator withdraws the welding gun from the stud, the aforedescribed circuit will be broken and relay 1RL deenergized resulting in the closing of relay contacts 49. Upon this event, a circuit will be completed through relay contacts 49 and across contacts 55 which, for the moment, will be assumed to be closed.

At this time, there is a potential applied to one side of the AND gate 54. Memory circuit 51 is also, at this time, set to a high level and this level is impressed upon the second input to the AND gate by means of conductor 56. The resultant two inputs to the AND gate will produce an output from the AND gate which is passed, by means of OR gate 57, to a timer 60 and a pair of amplifiers 61 and 62.

The amplifiers 61 and 62, upon receipt of the signal, produce a potential which is applied to operate three pneumatic relays 63, 64 and 65 which carry out the transfer and dispatching functions of the stud to the welding gun. More specifically, relay 63 operates an air valve to transfer the stud in position in the escapement mechanism and relay 64 operates an air valve to blow the stud through the feed line to the welding gun. Relay 65 operates the air valves for the pneumatic cylinder in the welding gun to position the stud in the chuck of the gun.

Simultaneous with the initiation of the stud feeding function, the signal passing through the OR gate 57 also initiates the timing of the timer 60. The timer 60 is a variable timer which may be selectively set to time out after a predetermined time. Upon the timer timing out, a signal is applied to memory circuit 51 to reset the memory circuit to its low output position. Relay 1CR then becomes deenergized and relay contacts 53 open and the controller resets for the next welding cycle.

Some welding processes are carried in what is called the drawn arc mode in which the stud is drawn from the workpiece with a resultant arc and subsequently plunged into engagement with the workpiece. Premature feeding of the stud to the welding gun may occur when welding apparatus of this nature is employed. This premature feeding is avoided in the present invention by means of a time delay relay 1TDR and its associated relay contacts 55. The potential for actuating the gun solenoid which initiates in the controller is passed through the coordinator of the present invention and then to the welding gun solenoid. The time delay relay 1TDR is placed in parallel with the gun solenoid and is actuated simultaneously with the gun solenoid. Accordingly, as the welding cycle is initiated and the gun solenoid lifted, relay contacts 55 will be opened and the automatic feeding circuit through relay contacts 49 broken. The relay 1TDR includes a sufficient time delay in closing contacts 55 after the gun solenoid is deenergized to permit the stud to be fully returned to the workpiece.

It will be recalled that relay contacts 49 remain open only so long as there is a circuit completed through the stud and welding gun. When the stud is raised in the drawn arc mode, the contact is broken and relay contacts 49 momentarily close. Were it not for time delay relay contacts 55 being opened during this interval, the automatic stud feeding circuit would be momentarily closed and the initiation of the stud feeding mechanism might result.

The time delay relay also serves another function in preventing premature feeding of the studs. This occurs under those circumstances in which the operator prematurely withdraws the welding gun from the stud before the welding cycle is completed. The time delay in the closing of relay contacts 55 will, nevertheless, prevent the automatic feeding of the studs until a satisfactory period of time has passed.

Under some circumstances, it may be desirable to manually initiate the feed of the stud to the welding gun. An example of such circumstances may be immediately after setting up the welding apparatus or in the event the automatic feeding mechanism has malfunctioned. This manual feeding may be accomplished through a circuit which includes a feed switch which is located in the welding gun and through normally closed relay contacts 50. Relay contacts 50 are under control of relay 1RL the same as relay contacts 49 and manual feeding of the studs is not possible unless the stud welding apparatus has been removed from the welding position, as earlier described.

Upon closing of the feed switch and whenever relay contacts 50 are closed, a signal is applied to a second memory circuit 66 which produces a high output upon receipt of the signal. The output from the memory circuit 66 is applied through the OR gate 57 to the timing circuit 60 and amplifiers 61 and 62. The receipt of this signal at the timing circuit and amplifiers initiates the same feeding operation and timing function as described in respect to the receipt of a similar signal from the AND gate 54.

Upon timing circuit 60 timing out, as in the case of the receipt of the signal from the AND gate 54, the timing circuit initiates a resetting signal to the memory circuit 51 and 66 to reset their output to the low position and prepare the controller and coordinator for the next welding cycle.

At times, the operator may not be utilizing the studs from the feeding mechanism for extended periods of time and accordingly the vibratory part of the feeding mechanism is being uselessly operated. This is avoided in the present circuit by means of a second time delay relay 2TDR which is energized simultaneously with the transfer and feeding functions of the feed mechanism. Relay 2TDR, upon energization, turns on the vibratory part of the feeding mechanism for a predetermined time. If, after the expiration of the predetermined time, the relay has not again been reenergized indicating the consumption of studs, the vibrator will be turned off and will remain at rest until the next stud welding cycle is initiated.

Upon initially turning on the welding apparatus and control apparatus at the beginning of a work shift, the memory circuits 51 and 66 and the timing circuit 60 may have become misorientated in respect to the welding cycle. These memory circuits and the timer are reset to their initial positions upon turning on of the welding apparatus by means of a reset initiating circuit 67 which operates only once upon the initial turning on of the apparatus.

The power supplies for the control circuits, solenoids, memory circuits, timing circuits and amplifiers have been omitted from FIG. 2 for the purpose of simplicity, however, the appropriate connections should be apparent to one of ordinary skill in the art.

The invention has been described in respect to a particular embodiment thereof shown in the drawings. However, it is expected that various modifications of the above-described invention will be apparent to those skilled in the art and it is to be understood that such modifications can be made without departing from the scope of the invention, if they are within the spirit and scope of the accompanying claims.

I claim:

1. In welding apparatus employing a stud welding gun, a power supply providing the welding energy, a controller for controlling the welding cycle and a stud feeding mechanism supplying studs to the stud welding gun, the improvements of a coordinator for coordinating the operation of the stud welding controller and the stud feeding mechanism comprising:

first circuit means for applying a triggering signal to the controller to initiate the welding cycle;

second circuit means connected through the welding gun for initiating the triggering signal in the first circuit means, and third circuit means for overriding the second circuit means to prevent the triggering signal from occurring whenever the welding gun is not in its proper welding position.

2. The coordinator of claim 1 further including fourth circuit means for automatically rendering the feeding mechanism operative; and said fourth circuit means being under the control of said third circuit means to be rendered inoperative whenever said second circuit means is operative and conversely.

3. The coordinator of claim 2 further including fifth circuit means manually operable to render said feeding mechanism operative; and said fifth circuit means being under the control of said third circuit means to be rendered inoperative simultaneously with said fourth circuit means.

4. The welding apparatus of claim 2 wherein the feed mechanism includes a motorized assorting and coordinating mechanism for the studs to be fed to the welding gun; and wherein the coordinator includes delay circuit means responsive to operation of the feed mechanism to turn on the assorting and coordinating mechanism for a predetermined time following the initiation of the feed mechanism.

5. The coordinator of claim 2 wherein said third circuit means includes circuit interrupting means for controlling said second and fourth circuit means and wherein said circuit interrupting means will not be operative to render said second circuit means operative until a circuit is alternately completed between the welding gun or its included stud and the workpiece to which the stud is to be welded.

6. The coordinator of claim 5 further including a delay timer in circuit with said fourth circuit means and which is rendered operative by energization of a lifting solenoid in the welding gun to open said fourth circuit means for a predetermined period of time to prevent operation of the feeding mechanism during the time the stud is lifted from the workpiece and breaks the circuit between the stud and workpiece resulting in the deenergization of the third circuit means.

7. The coordinator of claim 2 wherein the fourth circuit means is under the control of a two input AND gate in which a first input to the AND gate is the triggering signal from the first circuit means and wherein the second input to the AND gate is under the control of the third circuit means to render the second input present to the AND gate only when the gun is not in welding position.

8. The coordinator of claim 7 wherein the triggering signal is provided by a first memory circuit.

9. The coordinator of claim 8 wherein the output from the AND gate renders the gun feeding mechanism operative and simultaneously initiates the timing function of a fixed timer which, upon timing out, resets the first memory circuit to a level to render the AND gate inoperative.

10. The coordinator of claim 9 including fifth circuit means manually operable to render the feed mechanism operable; and said fifth circuit means includes a second memory circuit providing an output, said output thereof providing an identical initiating signal as that of the AND gate to render the feed mechanism operative and initiate timing of the timer and wherein said timer functions upon timing out to reset the second memory circuit to render said fifth circuit means inoperative.

11. In welding apparatus employing a stud welding gun, a power supply providing the welding energy, a controller for controlling the welding cycle and a stud feeding mechanism supplying studs to the stud welding gun, the improvements of a coordinator for coordinating the operation of the stud welding controller and the stud feeding mechanism comprising:

a triggering circuit connected through the stud welding gun and controller and providing a triggering signal for initiating the welding cycle, a stud feeding circuit connected between the controller and the stud feeding mechanism providing a stud feeding signal to the stud feeding mechanism, and protective circuit means for overriding said feeding signal whenever the welding gun is in welding position.

12. The coordinator of claim 11 further including timer means rendered operative by the presence of a stud feeding signal to initiate a timing function which, upon timing out, renders the stud feeding circuit inoperative.

13. The coordinator of claim 11 wherein the initiation of the stud feeding signal is dependent upon the presence of both a triggering signal and a signal from said protective circuit means.

14. The coordinator of claim 13 further including a two input AND gate wherein the signal from the protective circuit and the triggering circuit are the inputs to the AND gate, and timer means, the input to which is the output of the AND gate which, upon timing out, resets the AND gate to terminate the stud feeding signal.

15. In welding apparatus employing a stud welding gun, a power supply providing the welding energy, a controller for controlling the welding cycle and a stud feeding mechanism supplying studs to the stud welding gun, the improvements of a coordinator for coordinating the operation of the stud welding controller and the stud feeding mechanism comprising;

a triggering circuit connected through the stud welding gun and the controller providing a triggering signal to initiate the welding cycle, a protective circuit for overriding the initiation of the triggering signal whenever the welding gun is not in welding position, a stud feeding circuit connected between the controller and the stud feeding mechanism for initiating a stud feeding signal upon the presence of a triggering signal, and timing means initiated upon the presence of a stud feeding signal to begin a fixed timing function which, upon timing out, terminates the stud feeding signal.

16. In welding apparatus employing a stud welding gun, a power supply providing the welding energy, a controller for controlling the welding cycle and a stud feeding mechanism supplying studs to the stud welding gun, the improvements of a coordinator for coordinating the operation of the stud welding controller and the stud feeding mechanism comprising;

a gun triggering circuit connected through the welding gun and the controller for generating a triggering signal for initiating the welding cycle, a stud feeding circuit connected between the controller and the stud feeding mechanism generating a stud feeding signal, and timer means rendered operative by the presence of a stud feeding signal to initiate a timing function of a predetermined time, said timer, upon timing out, terminating the stud feeding signal.